United States Patent
De Mers et al.

(10) Patent No.: US 8,218,006 B2
(45) Date of Patent: Jul. 10, 2012

(54) NEAR-TO-EYE HEAD DISPLAY SYSTEM AND METHOD

(75) Inventors: Robert E. De Mers, Nowthen, MN (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 29 days.

(21) Appl. No.: 12/957,679

(22) Filed: Dec. 1, 2010

(65) Prior Publication Data

US 2012/0140070 A1    Jun. 7, 2012

(51) Int. Cl.
*H04N 7/00* (2006.01)
*H04N 7/18* (2006.01)

(52) U.S. Cl. ............. 348/144; 348/25; 348/39; 345/7

(58) Field of Classification Search .......... 348/25, 348/39, 144
See application file for complete search history.

(56) References Cited

U.S. PATENT DOCUMENTS

| | | | |
|---|---|---|---|
| 4,048,653 A | 9/1977 | Spooner | |
| 5,281,957 A * | 1/1994 | Schoolman | 345/8 |
| 5,742,264 A | 4/1998 | Inagaki et al. | |
| 5,933,125 A | 8/1999 | Fernie et al. | |
| 6,396,497 B1 | 5/2002 | Reichlen | |
| 6,407,724 B2 * | 6/2002 | Waldern et al. | 345/8 |
| 6,497,649 B2 | 12/2002 | Parker et al. | |
| 6,839,041 B2 | 1/2005 | Susnfara et al. | |
| 6,903,708 B1 | 6/2005 | Heed et al. | |
| 7,319,438 B2 | 1/2008 | Marino et al. | |
| 7,593,026 B2 | 9/2009 | Turner | |
| 2001/0038360 A1 | 11/2001 | Fukushima et al. | |
| 2002/0130953 A1 | 9/2002 | Riconda et al. | |
| 2010/0013739 A1 | 1/2010 | Sako et al. | |

* cited by examiner

*Primary Examiner* — Michael Won
(74) *Attorney, Agent, or Firm* — Ingrassia Fisher & Lorenz, P.C.

(57) ABSTRACT

A near-to-eye (NTE) display allows an operator of an apparatus, such as a pilot of an aircraft, to see a conformal video presentation of the view outside the apparatus. Significant objects outside are converted into a conformal video view. An accelerator measures movement and rate of movement of the NTE display positioned on the operator's head, and if the movement and rate exceed a threshold, either ceases the continued display, removes, or deemphasizes the conformal image, for the period of the delay in order to eliminate any jerky or jittery motion of the displayed conformal image, which may be distracting, irritating, or headache inducing to the pilot.

22 Claims, 7 Drawing Sheets

NEAR-TO-EYE HEAD DISPLAY SYSTEM AND METHOD

TECHNICAL FIELD

The exemplary embodiments described herein generally relates to aircraft operations and more particularly to conformally displaying near-to-eye (NTE) images of an object such as another aircraft to a pilot of an airborne aircraft, and taxiways and obstacles to a pilot of a ground based aircraft.

BACKGROUND

It is beneficial for a pilot to know the positioning of other aircraft when airborne and the layout of the taxiways and runways when taxing for takeoff or from landing. Traditionally, airborne pilots have relied on ground control for assistance in the location of other airborne aircraft and eye contact with other aircraft within the vicinity.

Furthermore, pilots have relied upon paper charts to gain knowledge of the airport layout, understand the aircraft position within the airport, and to navigate the airport taxiway/runway matrix. More recently, this information has been made available to the pilot by electronic flight bags and electronic chart readers. However, these known electronic displays are typically monochromatic and lack any prominence provided for runways and critical markers that would aid the pilot in discerning between taxiways, runways, and obstacles such as construction and slopes in the taxiway.

As the operation of vehicles, such as airplanes, becomes more complex, it is preferable that the vehicle operator, e.g., the flight crew, be attentive and receive information in a timely manner to ensure proper operation. One means for providing information is a near-to-eye (NTE) display system. A NTE display system is a type of head worn display (HWD) system which uses a visor, a helmet, or a cap to place a display in front of one or both eyes. Typically, the NTE display includes a semi-transparent optical combining element upon which the display symbology is presented. The source of the symbology may be a liquid crystal display (LCD), liquid crystal on silicon (LCos) display, or organic light emitting diode (OLED) display). The combining element allows the information presented on the NTE display to be superimposed on the visible scene. For example, a NTE display can provide a three-dimensional view of a scene outside the vehicle for use by the vehicle's operator even in poor visibility conditions, such as thick fog conditions. However, a sudden turn of the head during normal operations, such as a sudden movement of the head during aircraft maneuvering, may result in an undesirable motion of the displayed image. As the pilot quickly turns his head, latency in known NTE systems results in the conformal image lagging behind the actual image seen outside the cockpit.

Accordingly, it is desirable to provide a method and system that smoothly displays conformal images (symbology) that may be more easily interpreted by the pilot. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A method and apparatus are provided for displaying data and conformal images of objects. The apparatus comprises a near-to-eye (NTE) display device that allows an operator to see a conformal image of significant objects. The image is frozen when the rate of movement of the operators head exceeds a threshold.

In an exemplary embodiment, a method of presenting conformal images on a near-to-eye display to an operator of an apparatus includes creating a conformal video image of significant objects, displaying the conformal video image on the near-to-eye display overlying the significant objects, comparing a rate of movement in a direction of the near-to-eye display with a threshold, and modifying the displaying of the significant objects for a period of time when the rate of movement is greater than the threshold.

In another exemplary embodiment, a method of displaying a conformal video image on a near-to-eye display worn on the head of a pilot of an aircraft, including creating a conformal video image based on significant objects outside the aircraft, displaying the conformal video image on the near-to-eye display, comparing a movement of the pilot's head with a threshold, maintaining a last rendered image of the conformal video image until the movement is less than the threshold, and resuming the displaying of the conformal video image when the movement is greater than the threshold.

In yet another exemplary embodiment, a system for viewing conformal images on a near-to-eye display by an operator of an aircraft includes an apparatus configured to determine an actual video image of significant objects outside the aircraft; and a near-to-eye display system comprising a near-to-eye display configured to be positioned adjacent an eye of a pilot of the aircraft; a sensor configured to determine a direction and rate of movement of the near-to-eye display; and a controller configured to create a conformal video image based on the actual image; provide the conformal video image to the near-the-eye display; determine if the direction and rate of movement of the near-to-eye display is greater than a threshold; and modify providing the conformal video image to the near-to-eye display for a period of time if the direction and rate of movement is greater than threshold.

BRIEF DESCRIPTION OF THE DRAWINGS

The present invention will hereinafter be described in conjunction with the following drawing figures, wherein like numerals denote like elements.

DETAILED DESCRIPTION

Figure 1:
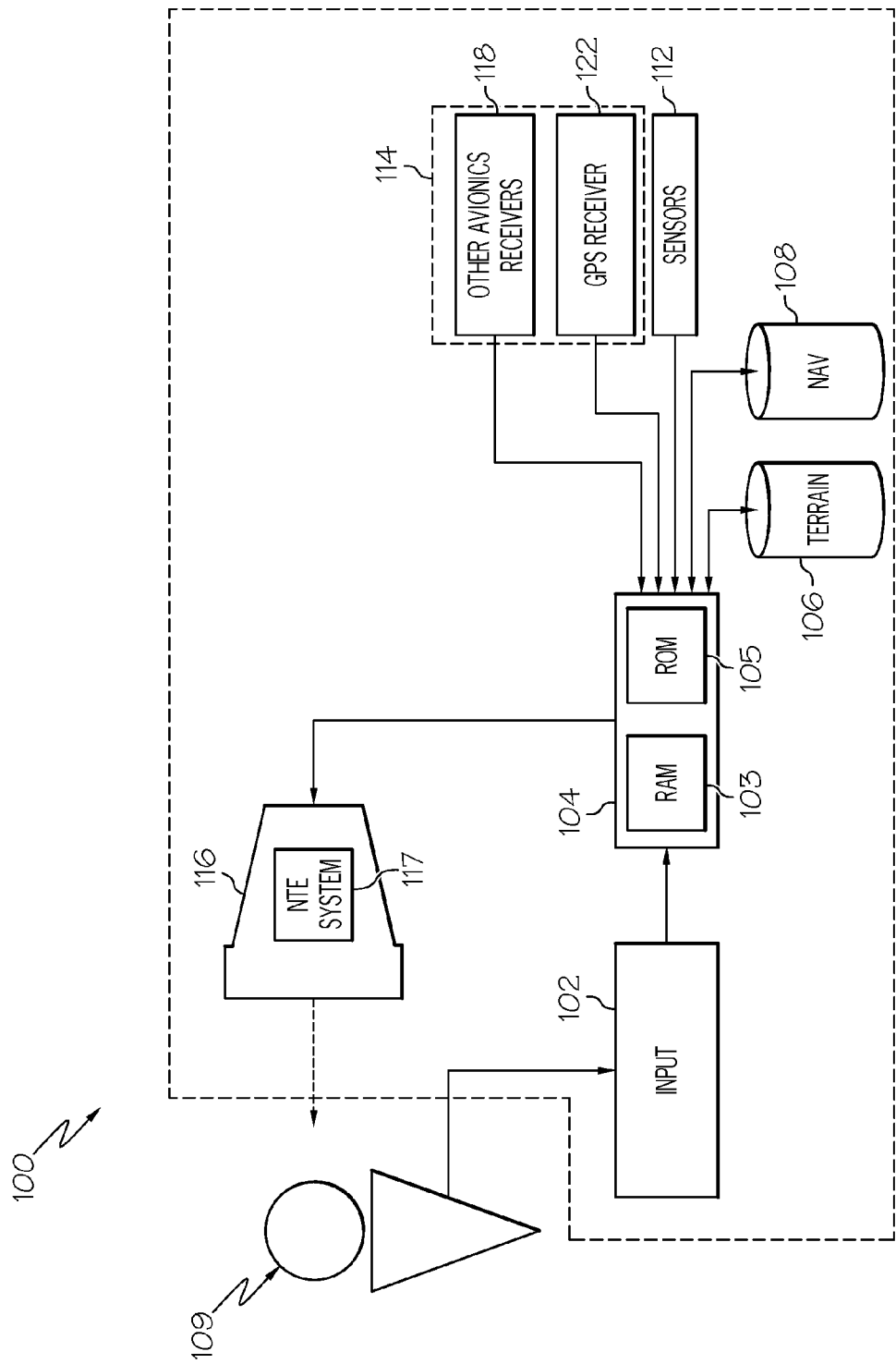
FIG. 1 is a functional block diagram of a flight display system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Generally, the exemplary embodiments described herein include a near-to-eye (NTE) display device that allows the pilot of an aircraft to see conformal video images of the actual images outside of the aircraft while airborne or while on the ground. An NTE head tracking system provides a left to right range of motion, for example, 360 degrees, for visual scanning. Graphics generated for display tracks to the pilot's head movement. Input from, for example, a gimbaled head tracking Infrared camera, an array of fixed sensors, or a virtual or synthetic environment created from data, gives the pilot the ability to scan the sky or runway/taxiway for objects. An accelerator senses rapid movement of the NTE display device caused by intentional movement of the head such as a turning of the head during flight maneuvering, or unintentional movement, for example, due to turbulence. If the rapid movement (acceleration) exceeds a threshold, the conformal image is frozen or removed, thereby preventing a jerky or jittery motion of the conformal images that would be generated from the actual video images received during the head movement.

The aircraft's attitude (orientation) may be determined from inertial sensors, accelerometers, compasses, and air data sensors. While the NTE system processes the actual video images, created by a camera, sensors, or synthetically from stored data for example, the presentation on the NTE display of the conformal images may be ceased when rapid head movement is detected.

Techniques and technologies may be described herein in terms of functional and/or logical block components, and with reference to symbolic representations of operations, processing tasks, and functions that may be performed by various computing components or devices. Such operations, tasks, and functions may be referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Though the method and system of the exemplary embodiments may be used in any type of mobile vehicle, for example, automobiles, ships, and heavy machinery, any type of non-vehicle applications, for example, surgery, machinery and building maintenance, telerobotics and other remote viewing, and any type of space application including vehicle and suit mounted, the use in an aircraft system is described as an example.

Referring to FIG. 1, a flight deck display system 100 includes a user interface 102, a processor 104, one or more terrain databases 106 (including runway and taxiway information), one or more navigation databases 108, sensors 112, external data sources 114, and one or more display devices 116 (including the NTE system 117 subsequently discussed in more detail). The user interface 102 is in operable communication with the processor 104 and is configured to receive input from an operator 109 (e.g., a pilot) and, in response to the user input, supplies command signals to the processor 104. The user interface 102 may be any one, or combination, of various known user interface devices including, but not limited to, one or more buttons, switches, knobs, and touch panels (not shown).

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain including taxiways and runways over which the aircraft is moving, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. In at least one described embodiment, the sensors 112 include an Infrared camera. The other avionics receivers 118 include, for example, an ILS receiver and a GPS receiver. The ILS receiver provides aircraft with horizontal (or localizer) and vertical (or glide slope) guidance just before and during landing and, at certain fixed points, indicates the distance to the reference point of landing on a particular runway. The ILS receiver may also give ground position. The GPS receiver is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the operator 109. It will be appreciated that the display devices 116 may be implemented using any one of numerous known display devices suitable for rendering textual, graphic, and/or iconic information in a format viewable by the operator 109. Non-limiting examples of such display devices include various flat panel displays such as various types of LCD (liquid crystal display), TFT (thin film transistor) displays, and projection display LCD light engines. The display devices 116 may additionally be implemented as a panel mounted display, or any one of numerous known technologies.

As previously noted, the display devices 116 include an NTE display system 117. There are many known NTE systems. One known exemplary embodiment is described in U.S. patent application Ser. No. 12/707,293, which is hereby incorporated in its entirety by reference. The preferred embodiment shown in FIG. 2, includes the operator 109 of a vehicle, such as a flight crew member of an aircraft, wearing an NTE display system 117. The NTE display system 117 includes a headband 206 coupled to a NTE display 208, which preferably is semi-transparent. When correctly worn by the operator 109, the NTE display 208 is placed in the line of sight of the right eye 210 at a predetermined distance from the right eye 210. In this manner, information can be presented to the operator 109 on the NTE display 208 superimposed on the visible scene beyond, for example, the controls and other items inside the cockpit and/or the outside view through the window of the cockpit. Infrared light emitting diodes (LEDs) 214 are located on a portion 212 of the headband 206 to sense a direction the head of the operator 109 is facing (e.g. turned up, turned down, turned at one portion of a cockpit or another portion) at any point in time in order to present appropriate information on the NTE display 208. Other systems for tracking head movement include cameras or emitters on the headband, or the tracking system may be magnetic or inertial rather than optical.

Outside their use in the NTE display system 117, the LEDs 214 are utilized to provide more detailed information about the state and actions of the operator 109. The NTE display system 117 is configured to monitor the head position of operator 109 by monitoring the position and orientation of the NTE display device (i.e., the NTE display system 117). In this manner, the operator's head direction at any point in time can be sensed for generation and presentation of an appropriate transparent view including conformal graphics and/or other information on the NTE display 208.

Figure 2:
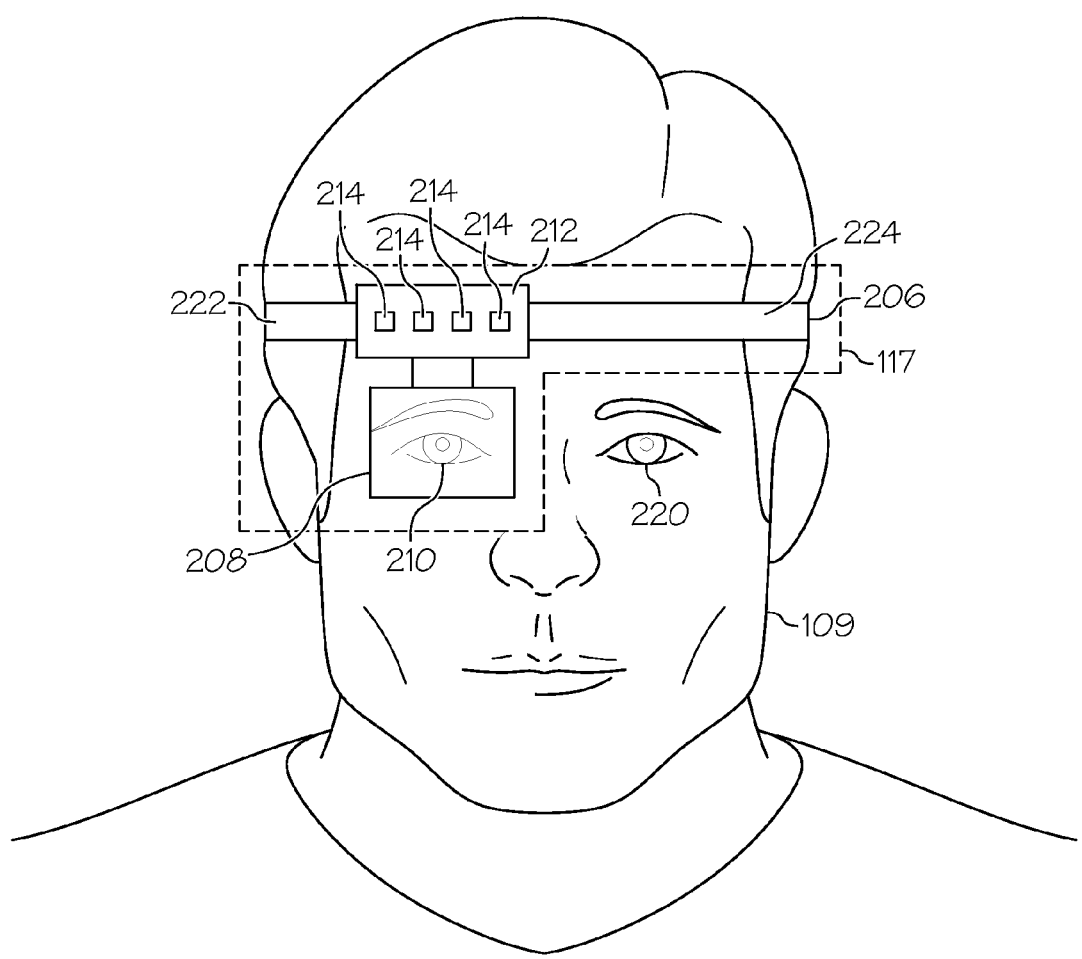
FIG. 2 is an exemplary embodiment of a near-to-eye display system.

The configuration of the NTE display system 117 is not limited to the device shown in FIG. 2. For example, while the NTE display system 117 is a monocular NTE display system, a binocular NTE display system could also be employed in the present embodiment. In addition, while the monocular NTE display system 117 in accordance with the present embodiment has the NTE display 208 situated over the right eye 210, the present embodiment could also use a monocular NTE display system having the display positioned in the line of sight of the left eye 220. And, the system could be biocular in which the same image is presented to both eyes, rather than binocular, in which slightly different images are presented to each eye in an attempt to create a stereoscopic pair of images that create a 3D experience for the user. Further, while the LEDs 214 are incorporated in the portion 212 of the headband 206, the number and location of the LEDs 214 can be anywhere on the headband 206, such as in portion 222 or portion 224.

The LEDs 214 are infrared in order to emit wavelengths not visible to the operator 109 and thereby not interfere with operation of the aircraft and/or the view of the operator 109. In addition, the LEDs 214 are positioned on the headband 206 to allow sensing of the position and orientation of the NTE display system 117 and the head of the operator. The present embodiment, however, is not limited to the use of infrared LEDs or, in fact, is not limited to the use of LEDs 214, and may include any reflective or emissive device attachable to the NTE display system 117 that would allow sensing of the position and orientation of the NTE display system 117 and, consequently, determination of the head direction of the pilot.

Figure 3:
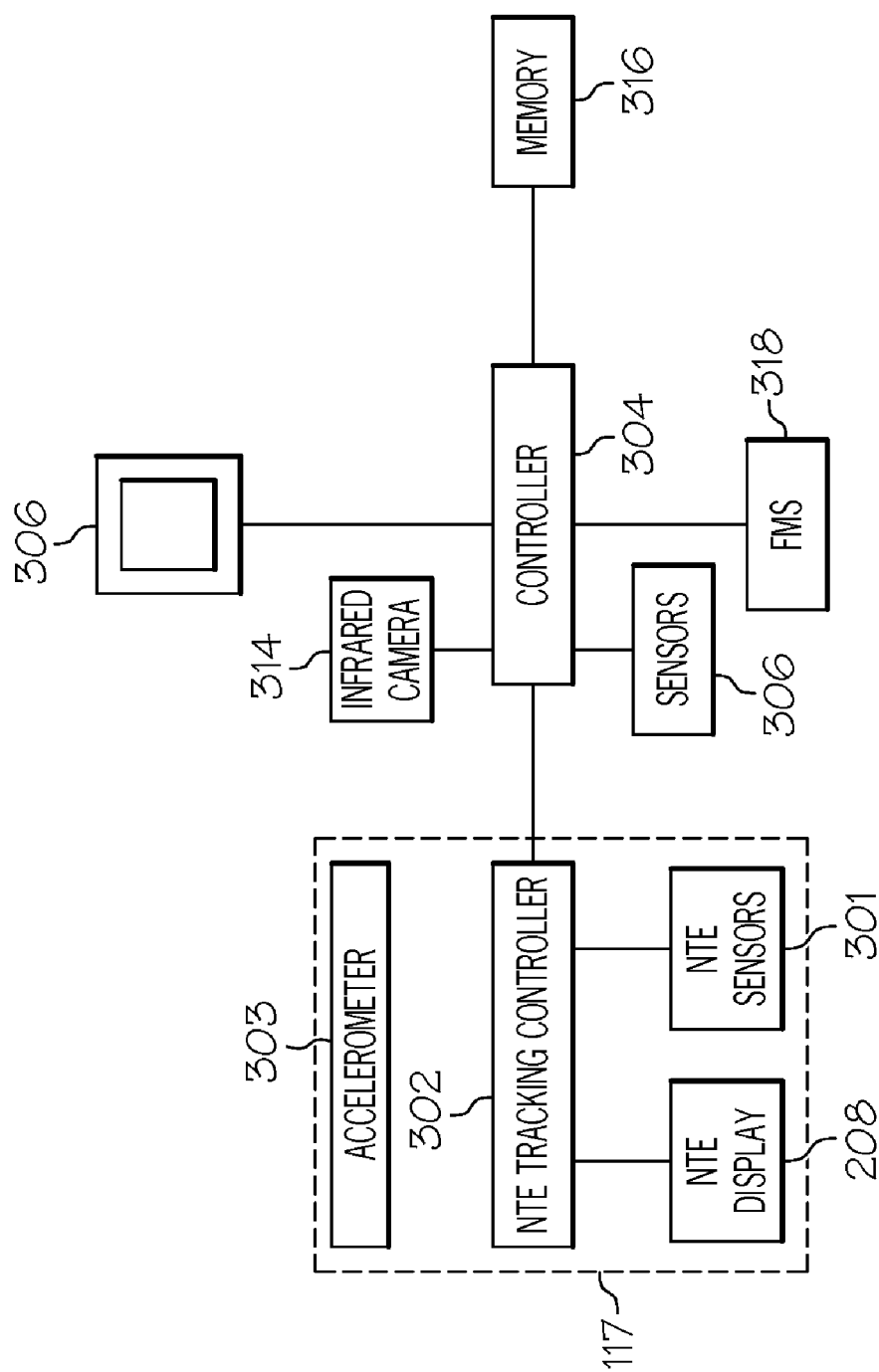
FIG. 3 is a functional block diagram of the near-to-eye display system of FIG. 2.

FIG. 3 depicts a block diagram of a system for aircraft operation in accordance with the present embodiment. The NTE display system 117 includes an NTE display 208, the NTE sensors 301 an NTE tracking controller 302 and an optional accelerator 303. The NTE tracking controller 302 receives signals from the NTE sensors 301, such as cockpit cameras (not shown) or infrared sensors, and generates signals which are provided to the NTE display 208. The signals present appropriate information on the NTE display 208 for generating the view of conformal graphics or other information for presentation to the operator 109.

The NTE tracking controller 302 also generates focus data corresponding to the direction of the head of the operator 109 in response to the information monitored by the NTE sensors 301, for example, whether the operator's 109 head is turned out the window (not shown) and in which direction, at the in-cockpit displays 306, or at some other point of interest. The NTE tracking controller 302 is coupled to a controller 304 for providing the focus data corresponding to the head direction of the operator 109. The focus data (e.g., the operator head tracking data resulting from monitoring the position and orientation of the NTE display system 117) is utilized by the controller 304 in presenting conformal images.

In one exemplary embodiment, data representative of the dimensions and location of an object are provided to the processor 104 and the NTE tracking controller 302 from the terrain databases 106. The location of the base aircraft is determined, preferably by GPS coordinates obtained from the avionics receivers 118 (e.g., a GPS receiver). The data provided by the processor 104 is converted to a conformal video for presentation on the NTE display 208.

In another exemplary embodiment, a camera 314, preferably Infrared but could be sensitive in other areas of the spectrum such as visible light, ultra violet, or a radar imager, for example, is positioned on the aircraft for imaging any obstacles in its view within taxiing distance of the aircraft, or other aircraft, for example, when airborne. The forward looking Infrared camera 314 can operate in any one of three modes. It may display the images as Infrared images in a first mode of operation, being gimbaled to the pilot's glaze by the NTE display system 117. In other embodiments, the image may come from a sensor array rather than a single, gimbaled sensor. Or from a single sensor array that does not scan mechanical. In the first mode, the camera 314 preferably can rotate about 360 degrees, and is coupled to the NTE tracking controller 302 (through the controller 304) for receiving actual video images taken by the camera 314 for conversion into conformal video images by the controller 304 for display on the NTE display 208. It should be noted, a gimbaled camera typically lags behind head movement to a degree greater than any latency introduced by the NTE display system; however, this camera lag is also compensated for by the exemplary embodiments described herein.

Figure 4:
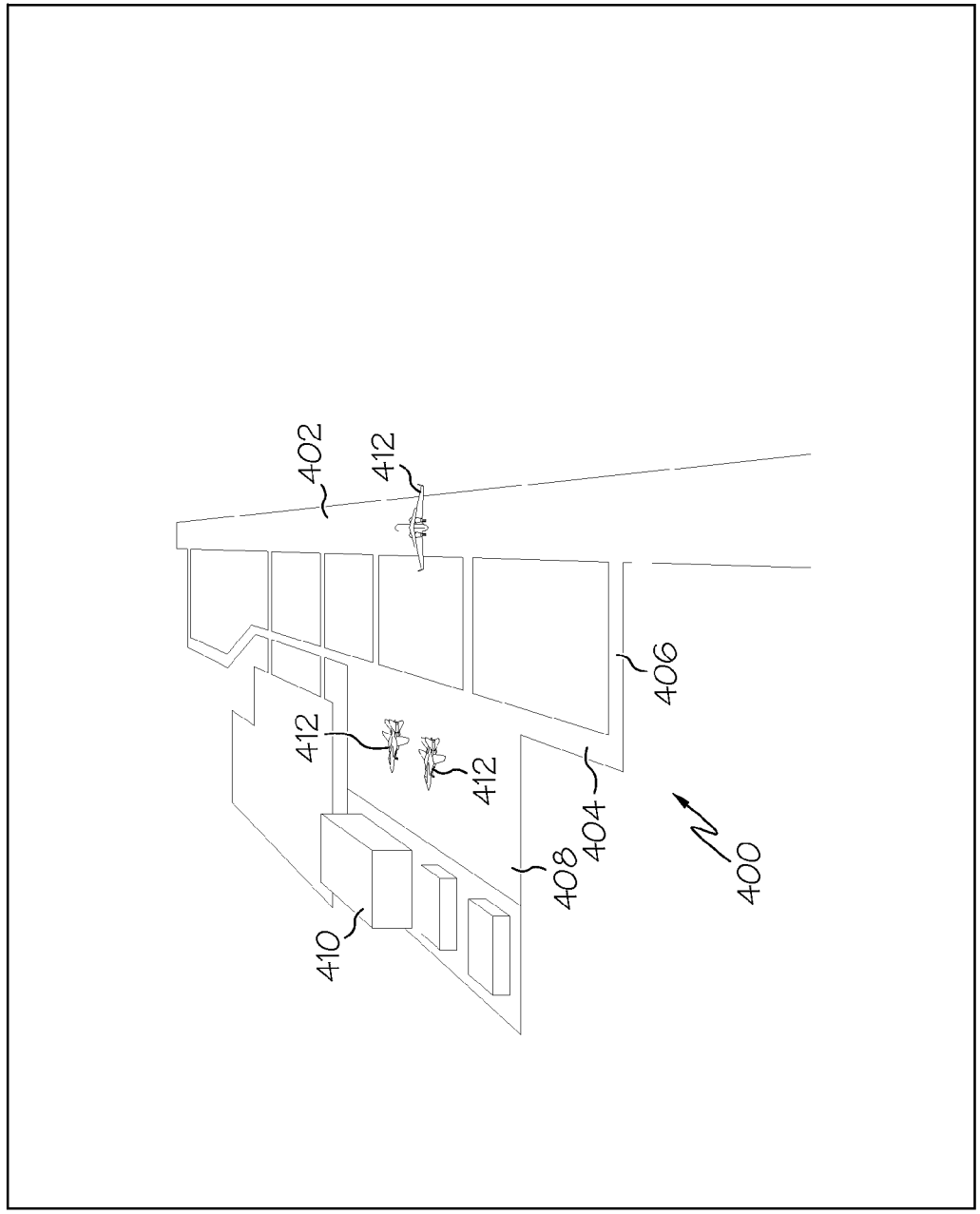
FIG. 4 is an exemplary view from an aircraft of the actual view ahead of the aircraft.
Figure 5:
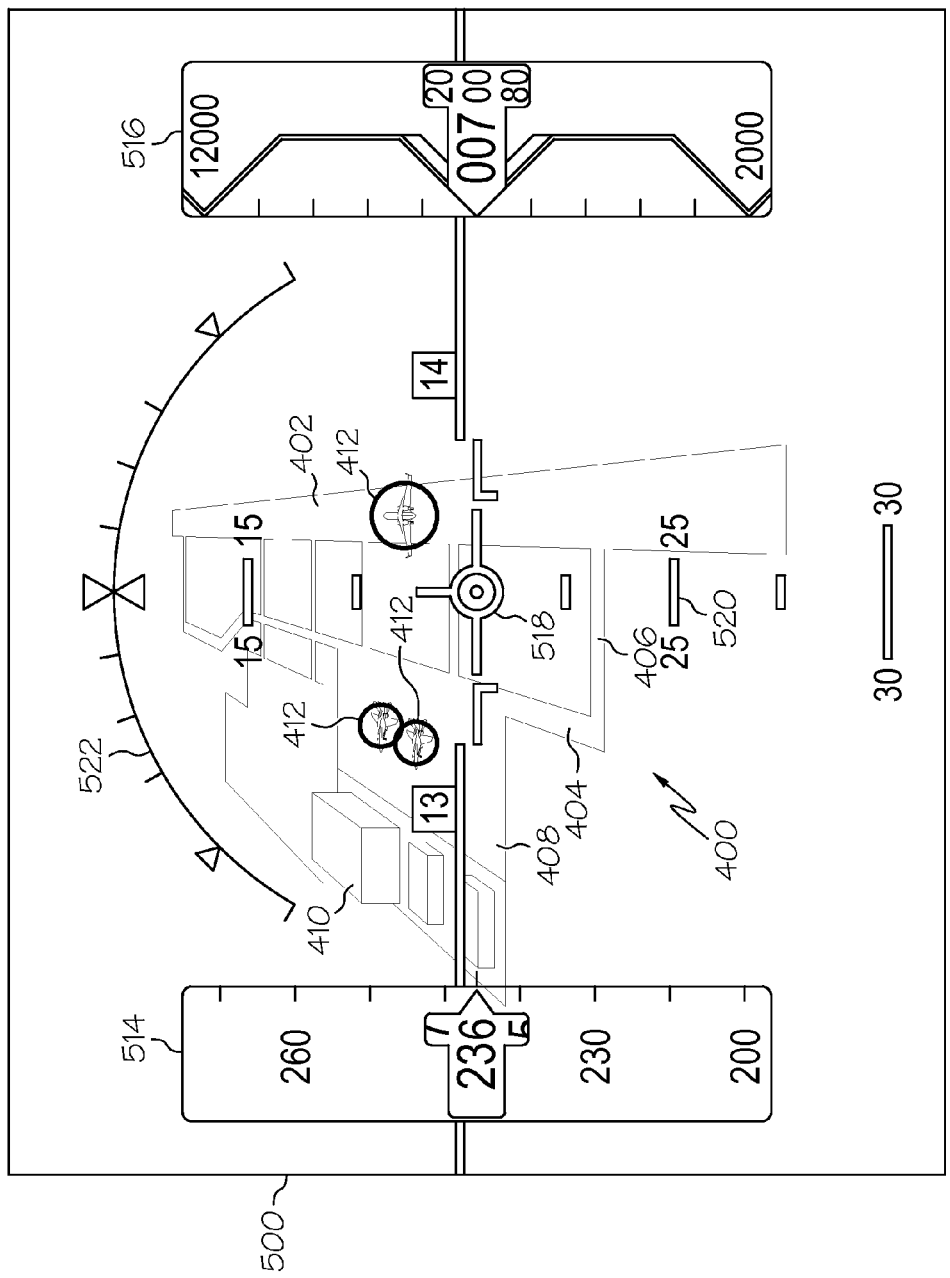
FIG. 5 is an exemplary conformal view on the near-to-eye display of the view of FIG. 4 and navigational data.

Referring to FIG. 4, a view of the actual environment ahead of the aircraft on approach to a runway is shown. During the approach, actual video images are created by the camera 314, by other sensors 306, or from stored data. The actual image 400 comprises, for example, a runway 402, a major taxiway 404, various other taxiways 406, a ramp 408, a terminal building 410, and aircraft 412. The controller 304 creates conformal video images for display on the NTE display 208. The conformal images may be information objects, for example as shown in FIG. 5, a threat circle for the aircraft 412, instead of actual representations. The conformal images may also include, for example, but not as depicted in the FIGS., runways, various taxiways, and buildings.

Other information, such as the navigational data shown in the display 500 of FIG. 5, including aircraft data such as an airspeed indicator 514, an altitude indicator 516, an attitude marker 518 including nose up and down degree markers 520, and a bank indicator 522. This data is stationary on the display, regardless of the direction in which the operator wearing the NTE display system 117 is turned.

Figure 6:
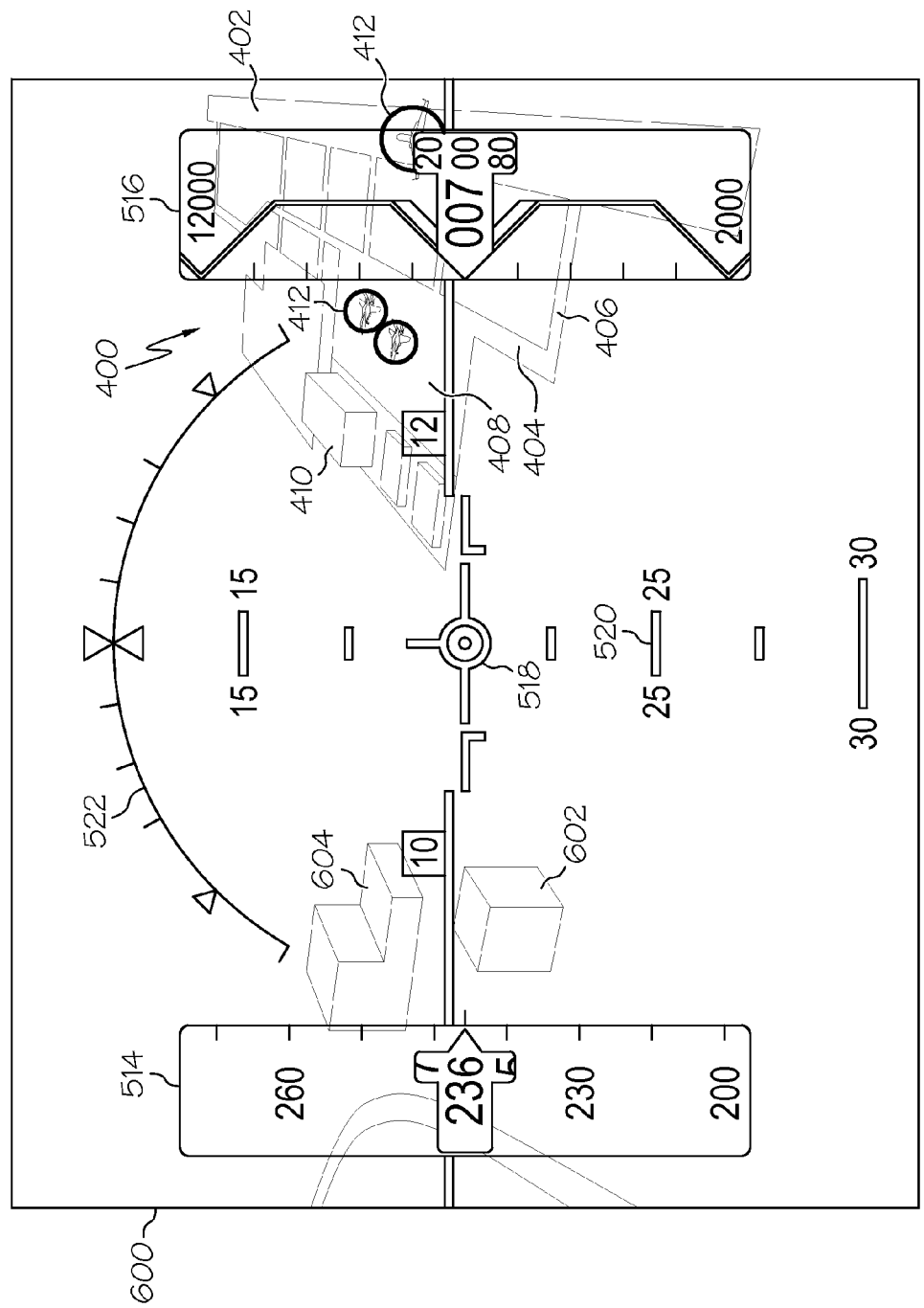
FIG. 6 is an exemplary conformal view of the near-to-eye display after the pilot has moved his head to the left.

When a pilot wearing the NTE display system 117 turns his head from, for example, the front of the aircraft as shown in FIG. 5, towards the left side of the aircraft (FIG. 6), the conformal images (aircraft 512) will move to the right of the NTE display 208 (still ahead of the aircraft). The aircraft navigational data presented on the NTE display 208 will remain in the same location on the display. Note that buildings 602, 604 are now visible on the NTE display 208. It is during this turning of the head by the pilot that the present apparatus and method are beneficial. In order to avoid a jerky, jittery motion of the displayed conformal image which may be quickly moving across the NTE display 208, or be "not smooth" in that it appears to skitter across the display rather than smoothly sliding to match the head motion, and which may be distracting, irritating, or headache inducing for the pilot, when the rate of movement of the pilot's head (NTE display system 117) exceeds a threshold, the image is "frozen" until the head movement stops, when the current image is then presented. In another exemplary embodiment, the conformal images 512 may be removed from the display 208 until the head movement stops. In yet another exemplary embodiment, the level of detail of the image may be reduced rather than completely freeze or hide the image. This would allow some of the image to stay conformally visible, while easing the load on the video processing that cannot keep up with the head motion.

Figure 7:
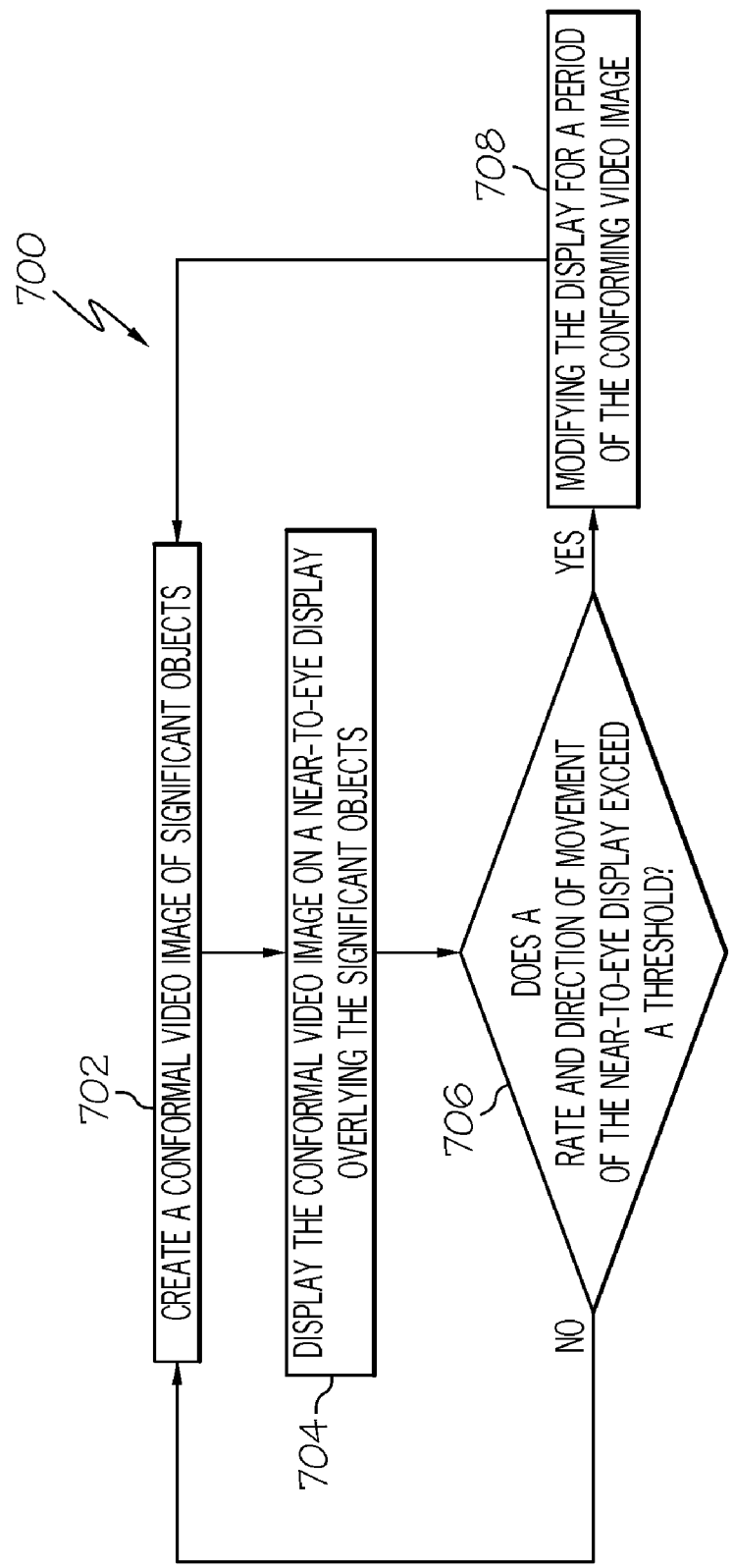
FIG. 7 is a flow chart in accordance with an exemplary embodiment.

FIG. 7 is a flow chart that illustrates exemplary embodiment 700 of a NTE display system 117 for freezing presentation on the display. The various tasks performed in connection with the embodiment 700 may be performed by software, hardware, firmware, or any combination thereof. For illustrative purposes, the following description may refer to elements mentioned above in connection with FIGS. 1-3. In practice, portions may be performed by different elements of the described system, e.g., a processor, a display element, or a data communication component. It should be appreciated that the embodiment 700 may include any number of additional or alternative tasks, the tasks shown in FIG. 7 and need not be performed in the illustrated order, and the embodiment 700 may be incorporated into a more comprehensive procedure or process having additional functionality not described in detail herein. Moreover, one or more of the tasks shown in FIG. 7 could be omitted from the embodiment 700 as long as the intended overall functionality remains intact.

Referring to a flow chart 700 for the embodiment of FIG. 7, a conformal video image of significant objects is created 702 and displayed 704 on the NTE display 208 overlying the significant objects. If the rate and direction of movement of the NTE display exceeds 706 a threshold, the conformal image remains the same, is removed for a period of time, or deemphasized, and the steps are repeated 708 from step 702. If the rate and direction of movement of the NTE display does not exceed 710 the threshold, the steps are repeated immediately from step 702.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims.

What is claimed is:

1. A method of presenting conformal images on a near-to-eye display to an operator of an apparatus, comprising:
    creating a conformal video image of significant objects;
    displaying the conformal video image on the near-to-eye display overlying the significant objects;
    comparing a rate of movement in a direction of the near-to-eye display with a threshold; and
    modifying the displaying of the conformal video image for a period when the rate of movement is greater than the threshold.

2. The method of claim 1 further comprising:
    displaying data on the near-to-eye display.

3. The method of claim 2 further comprising:
    continuing the displaying of the data when the near-to-eye display is halted.

4. The method of claim 1 further comprising:
    continuing the displaying after the period has lapsed.

5. The method of claim 1 further comprising:
    continuing the displaying after the rate of movement is less than the threshold.

6. The method of claim 1 wherein the creating comprises creating the conformal video image of an aircraft.

7. The method of claim 1 wherein the modifying comprises freezing the video image.

8. The method of claim 1 wherein the modifying comprises removing the video image.

9. The method of claim 1 wherein the modifying comprises deemphasizing the video image.

10. A method of displaying a conformal video image on a near-to-eye display for a pilot of an aircraft, comprising:
    creating the conformal video image based on significant objects outside the aircraft;
    displaying the conformal video image on the near-to-eye display;
    comparing a movement of the head of the pilot with a threshold;
    maintaining a last rendered image of the conformal video image until the movement is less than the threshold; and
    resuming the displaying of the conformal video image when the movement is greater than the threshold.

11. The method of claim 10 further comprising:
    displaying data on the near-to-eye display.

12. The method of claim 11 further comprising:
    continuing the displaying of the data when the near-to-eye display is maintaining the last rendered image.

13. The method of claim 10 wherein the creating comprises creating the conformal video image of an aircraft.

14. A system for viewing conformal images on a near-to-eye display by an operator of an aircraft, comprising:
    an apparatus configured to determine an actual video image of significant objects outside the aircraft;
    a near-to-eye display system comprising:
        a near-to-eye display configured to be positioned adjacent an eye of a pilot of the aircraft; and
        a sensor configured to determine a direction and rate of movement of the near-to-eye display; and
    a controller configured to:
        create a conformal video image based on the actual video image;
        provide the conformal video image to the near-to-eye display;
        determine if the direction and rate of movement of the near-to-eye display is greater than a threshold; and
        modify providing the conformal video image to the near-to-eye display for a period if the direction and rate of movement is greater than the threshold.

15. The system of claim 14 wherein the controller is further configured to provide data on the near-to-eye display.

16. The system of claim 15 wherein the controller is further configured to provide the data when the near-to-eye display is ceased.

17. The system of claim 14 wherein the controller is further configured to continue the displaying after the period has lapsed.

18. The system of claim 14 wherein the controller is configured to provide the conformal video image of a runway.

19. The system of claim 14 wherein the controller is configured to provide the conformal video image of navigational aids.

20. The system of claim 14 wherein the controller is configured to freeze the video image.

21. The system of claim 14 wherein the controller is configured to remove the video image.

22. The system of claim 14 wherein the controller is configured to deemphasize the video image.

* * * * *